United States Patent [19]

Uchida et al.

[11] Patent Number: 4,926,347

[45] Date of Patent: May 15, 1990

[54] PRINTER WITH EMULATION CARD INSTALLATION REPORTING FEATURE

[75] Inventors: Noboru Uchida, Sayama; Masahiko Kaneko, Kawagoe; Hisayoshi Matsumoto, Tokorozawa, all of Japan

[73] Assignee: Citizen Watch Co., Ltd., Tokyo, Japan

[21] Appl. No.: 105,034

[22] Filed: Oct. 6, 1987

[30] Foreign Application Priority Data

Oct. 7, 1986 [JP] Japan ................. 61-237178

[51] Int. Cl.[5] .................. G06F 3/12; G06K 15/02
[52] U.S. Cl. ..................... 364/519; 364/930; 364/940; 364/514; 400/61; 400/76
[58] Field of Search ........... 374/10, 8, 13; 364/481, 364/514, 200 MS File, 900 MS File, 518, 519, 521; 400/61, 62, 76, 83

[56] References Cited

U.S. PATENT DOCUMENTS

| 4,188,664 | 2/1980 | DeShon | 364/200 |
|---|---|---|---|
| 4,348,739 | 9/1982 | Deaver et al. | 364/900 |
| 4,527,250 | 7/1985 | Galdun et al. | 364/900 |
| 4,660,998 | 4/1987 | Tsuneki | 400/61 |
| 4,660,999 | 4/1987 | Tsuneki | 400/61 |
| 4,754,428 | 6/1988 | Schultz et al. | 364/900 |
| 4,792,910 | 12/1988 | Lange | 364/519 |

*Primary Examiner*—Gary V. Harkcom
*Assistant Examiner*—Raymond J. Bayerl
*Attorney, Agent, or Firm*—Lowe, Price, LeBlanc, Becker & Shur

[57] ABSTRACT

A printer capable of mounting various emulation integrated circuit (IC) cards storing control programs for matching the printer with various host computers and identifying the name of an IC card mounted therein. When it is determined by a central processing unit (CPU) in the printer that an IC card is attached to an IC card terminal and that the printer is being operated in a maintenance mode, data stored at a predetermined address in the card is printed and the type of card can be identified on the basis of the printed output.

12 Claims, 3 Drawing Sheets

PRINTER WITH EMULATION CARD INSTALLATION REPORTING FEATURE

BACKGROUND OF THE INVENTION

The present invention relates to a printer capable of identifying a type of emulation IC card mounted in the printer.

A conventional printer which performs printing operation in accordance with coded control information (ESC code) from a host computer has been known. However, code systems of ESC code vary depending on computer makers. Therefore, a conventional printer has been designed such that various types of emulation integrated circuit (IC) cards, which store control programs of different makers, respectively, can be interchangeably mounted in the printer, thereby enabling the printer to perform printing operation regardless of a maker of a host computer to which the printer is connected.

However, only a host computer can discriminate a type of emulation IC card currently mounted in a printer, and hence inconvenience is caused.

SUMMARY OF THE INVENTION

It is an object of the present invention to eliminate the conventional drawback and provide a printer capable of identifying a type of IC card currently mounted therein even if the printer is not connected with a host computer.

According to the present invention there is provided a printer having an IC card terminal to which an IC card can be detachably mounted. The printer includes a command means for generating a command for operating the printer in the maintenance mode. When the printer is operated in the maintenance mode, it is discriminated whether an emulation IC card storing card identification information at a predetermined address is mounted on the IC card terminal. If it is discriminated that the emulation IC card is mounted, the printer is controlled by control means to print the card identification information stored at the predetermined address in the IC card. Thus, the type of emulation IC card can be identified on the basis of this printed information.

An advantage of the present invention is that the contents of information stored in the emulation IC memory mounted in the printer can be printed without connecting the printer to the host computer so that the contents of the emulation IC memory can be easily checked by the printer itself before the printer is connected to the host computer.

DETAILED DESCRIPTION OF THE PREFERRED EMBODIMENT

Figure 1:
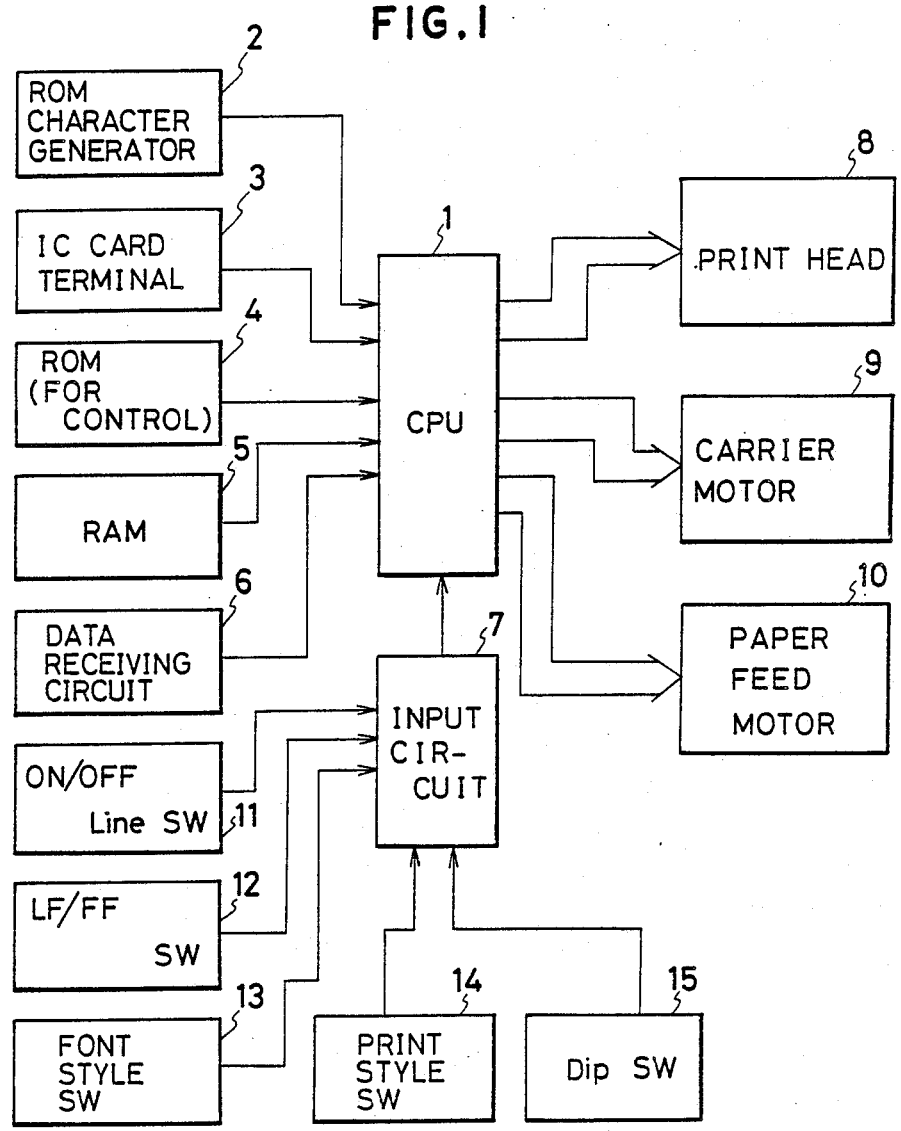
FIG. 1 is a block diagram showing a main part of a printer according to an embodiment of the present invention.

In FIG. 1, reference numeral 1 denotes a central processing unit (to be referred to as a CPU hereinafter) for controlling a printer; 2, a read-only memory (ROM) as a character generator; 3, an IC card terminal to which an emulation IC card or a random access memory (RAM) IC card can be detachably added; 4, a ROM for storing a control program for generally controlling the printer; 5, a RAM used for temporarily storing data; 6, a data receiving circuit for receiving signals from a host computer (not shown); 7, an input circuit; 8, a print head; 9, a carrier motor for driving a carriage; and 10, a paper feed motor. These elements 2 to 10 are connected to the CPU 1 through buses. In addition, an ON/OFF line selection switch 11 for selecting an ON or OFF line mode, a line feed/form feed (LF/FF) switch 12 for commanding the printer to perform line feeding/page feeding, a font style switch 13 for selecting a font of printing type, e.g., either of courier 10, prestige elite, bold face, and the like, a print style switch 14 for selecting letter quality, correspondence quality, and either of normal spacing and proportional spacing for a draft, and a DIP switch 15 for setting printing conditions such as a page length and a line width when the printer power is ON are connected to the input circuit 7. Furthermore, in the printer according to the embodiment, when the printer power is ON after the line feed/form feed switch 12 is turned on, the printer is commanded to perform test printing. When the printer power is ON after the ON/OFF line selection switch 11 and the line feed/form feed switch 12 are turned on, the maintenance mode is selected.

As described above various types of emulation cards are provided due to the fact that the ESC code systems vary depending on the computer makers so that the printer can be used regardless of a maker of a host computer to which the printer is connected. With regard to this situation, the printer according to the embodiment is designed such that the emulation IC cards can be detachably mounted to the IC card terminal 3, thereby operating the printer. Furthermore, an additional receiving buffer/down load RAM IC card can be connected to the IC card terminal 3. Contents of the emulation IC cards, e.g., information about the card and version names are stored at predetermined addresses thereof, respectively.

Figure 2:
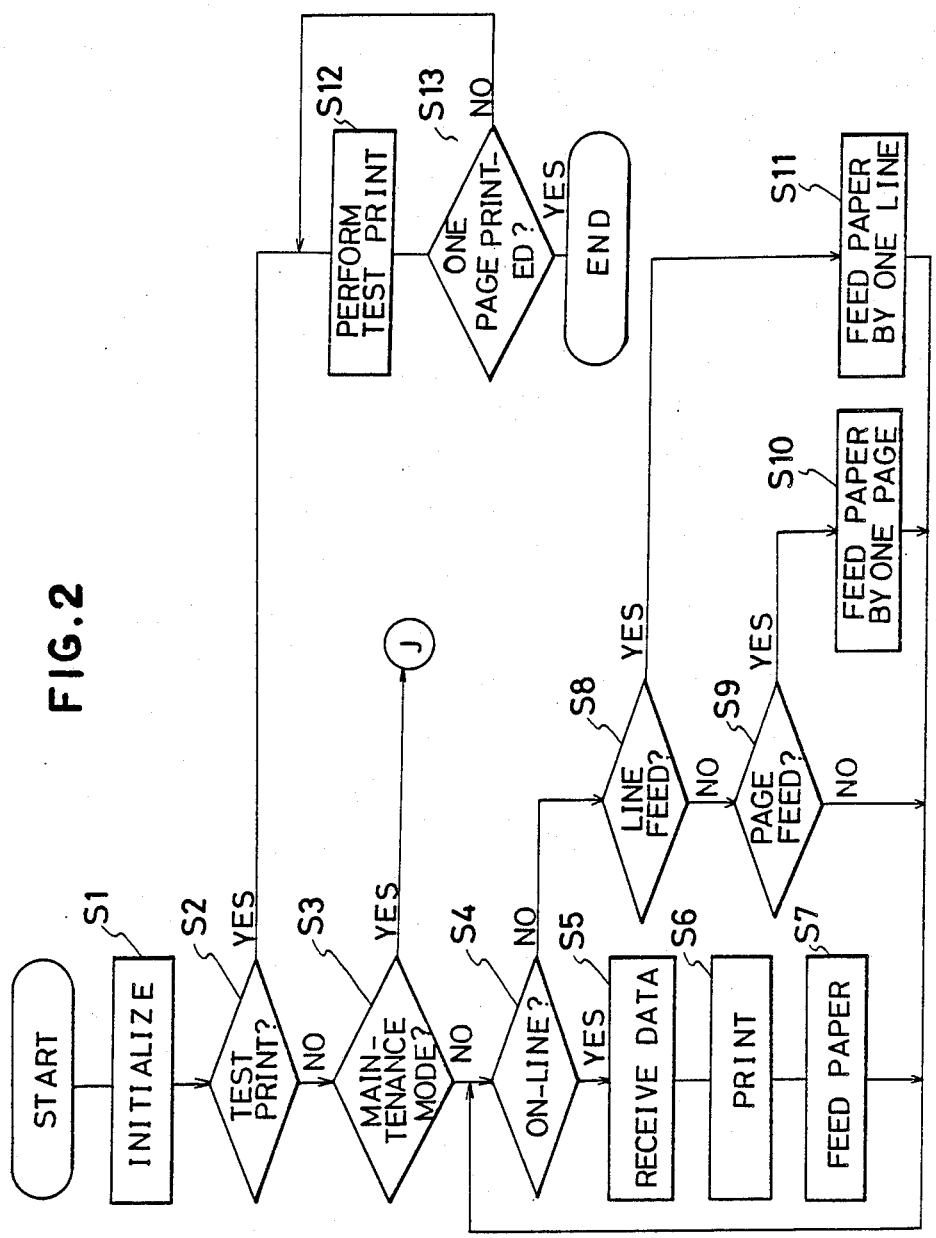
FIG. 2 is a flow chart showing a printing operation of the printer.
Figure 3:
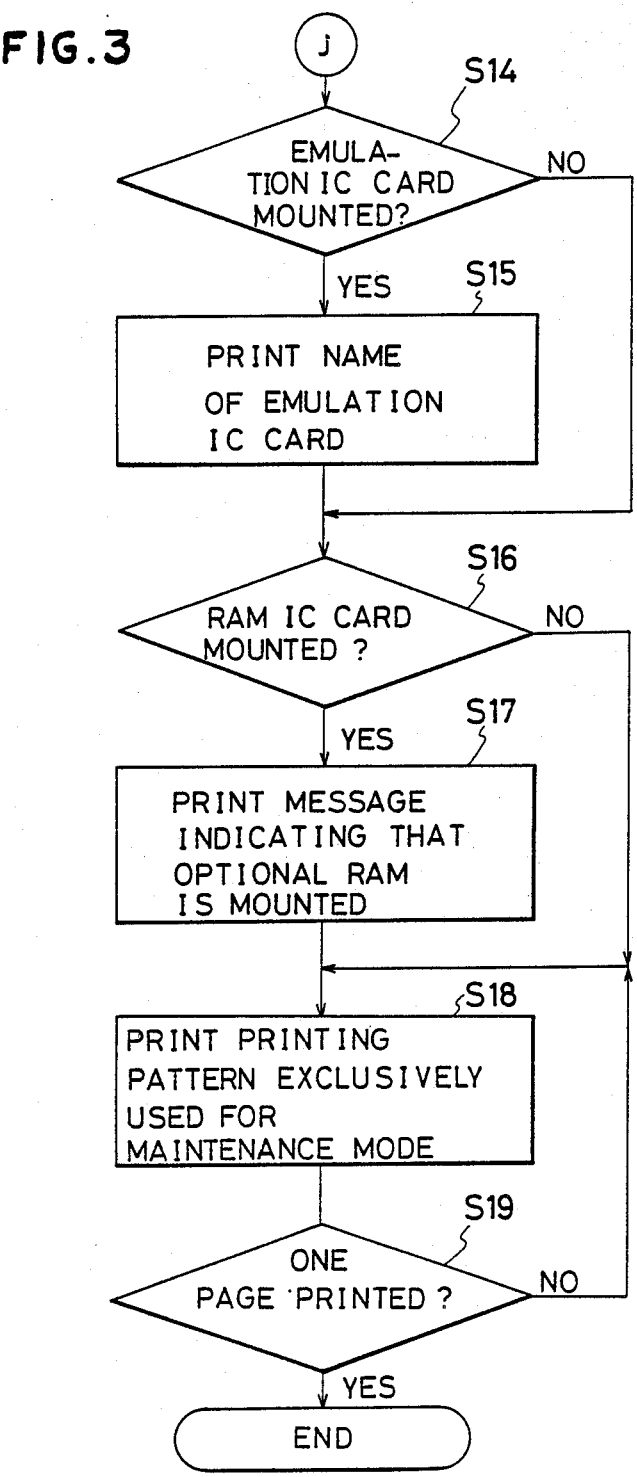
FIG. 3 is a flow chart showing an operation of the printer in the maintenance mode.

When such an IC card is attached to the IC card terminal 3 and a printer power switch is turned on, the CPU 1 performs operations in accordance with flow charts shown in FIGS. 2 and 3.

When the power is ON, the CPU 1 performs initialization (step S1). The CPU 1 determines whether the line feed/form feed switch 12 is turned on, i.e., whether a test print command is input or not when the power is ON (step S2). If the test print command is input, the program is terminated by printing one page of the test print (steps S12 and S13). If the test print command is not input, the CPU 1 determines whether the ON/OFF line selection switch 11 and the line feed/form feed switch 12 are turned on, i.e., whether a maintenance mode command is input or not when the power is ON (step S3). If NO in step S3, whether an ON line selection is made by the ON/OFF line selection switch 11 is determined (step S4). If the OFF line mode is selected, the CPU 1 determines (steps S8 and S9) whether a line feed command or a page feed command is input by the line feed/form feed switch 12. If the line feed command is input, the paper feed motor 10 is driven to feed paper by one line (step S11). If the page feed command is input, the paper feed motor 10 is driven to feed the paper by one page, and the flow returns to step S4. On the other hand, if the ON line command is input (step S4), data output from the host computer and received by the data receiving circuit 6 is printed and paper is fed, using the print head 8, the carrier motor 9, and the paper feed motor 10 (steps S5 to S7). Then, the flow returns to step S4, and the operations in steps S4 to S7 are repeated. The normal printing operation is performed as described above.

If the CPU 1 determines in step S3 that the maintenance mode is selected when the power is ON, the flow advances from step S3 to step S14 in FIG. 3. Subsequently, the CPU 1 reads out the data from a memory area at the predetermined address in the IC card mounted on the IC card terminal 3 and determines whether the IC card is mounted. For example, in order to perform this determination, the names of the emulation IC cards which can be mounted in the printer are respectively stored in the ROM 4 shown in FIG. 1, so that if the card name included in the read data coincides with either of the names thus stored, the CPU 1 determines that the emulation IC card is mounted. If the emulation IC card is mounted, the name of the emulation IC card and its version stored at predetermined addresses are printed (steps S14 and S15). If the emulation IC card is not mounted, the CPU 1 designates the predetermined address as a write address and writes specific data. Then, the CPU 1 determines whether the RAM IC card is mounted by reading out the contents stored at the same address as the write address (step S16). If the RAM IC card is mounted, a message indicating that the optional RAM is mounted is read from the ROM 4, and the message is printed (step S17). Thereafter, a printing pattern exclusively used in the maintenance mode is printed by one page (steps S18 and S19), and the flow is ended.

Note that the number of IC card terminals 3 can be 1, or 2 or more. In any case, when the printer power switch is turned on in the maintenance mode, the name of the emulation IC card attached to the IC card terminal 3 and its version are printed, or the message indicating that the RAM IC card is mounted is printed.

What is claimed is:

1. A printer having an integrated circuit (IC) card terminal to which an emulation IC card having storage means can be detachably mounted, comprising command means for generating a command signal for switching said printer to a maintenance more independent of a host processor, discrimination means for discriminating whether an emulation IC card storing card identification information is attached to said IC card terminal, and control means for controlling said printer to print the card identification information in said storage means on the emulation IC card responsive to said command signal switching said printer to said maintenance mode when an emulation IC card is attached to said IC card terminal.

2. A printer according to claim 1, wherein when said discrimination means further includes means for discriminating that a RAM IC card is attached to said IC card terminal, said control means causes said printer to print a message indicating that an optional RAM is mounted responsive to said command signal switching said printer to said maintenance mode when an emulsion IC card is attached to said IC card terminal.

3. A printer according to claim 1, wherein said command means includes switching means to selectively assume at least a selectable state at which the maintenance mode is selected when power is applied to said printer, whereby said command means generates said command signal when said switching means assumes one said selectable state upon power being applied to said printer.

4. A printer according to claim 3, wherein said switching means is manually controllable.

5. In a printer including a central processor and a printer memory, said printer being adapted for use with a computer which is detachably connected therewith and being further adapted to have at least one card of at least one of the emulation and memory types connected thereto, and said at least one card having data stored therein, a method of identifying said at least one card in a manner which is independent of said computer comprising the steps of
  (a) establishing a maintenance mode and an operating mode for said printer,
  (b) activating the maintenance mode of said printer,
  (c) determining said activation of said maintenance mode,
  (d) detecting the presence and identity of said card,
  (e) printing indicia corresponding to said identity of said card on said printer and
  (f) repeating steps (d) and (e) for each card detected in step (d).

6. The method as recited in claim 5, wherein the said detecting step includes the steps of
  retrieving a portion of data from said data stored in said card and
  comparing said portion of data with information stored in printer memory.

7. The method recited in claim 6, wherein data for the said step of printing of said indicia are stored on said card.

8. The method recited in claim 6, wherein data for the said step of printing of said indicia are stored in said printer memory.

9. A method of identifying at least one card of at least one of emulation and memory types installed in a printer, said printer being adapted to be connected to a computer, comprising the steps of
  (a) establishing a maintenance mode and an operating mode for said printer,
  (b) activating the maintenance mode of said printer,
  (c) determining said activation of said maintenance mode,
  (d) detecting the presence and identity of said card,
  (e) printing indicia corresponding to said identity of said card on said printer and
  (f) repeating steps (d) and (e) for each card detected in step (d)
whereby said at least one card is identified to an operator by the printer in a manner which is independent of said computer.

10. The method as recited in claim 9, wherein the said detecting step includes the steps of
  retrieving a portion of data from said data stored in said card and
  comparing said portion of data with information stored in said printer memory.

11. The method recited in claim 10, wherein data for the said step of printing of said indicia are stored on said card.

12. The method recited in claim 10, wherein data for the said step of printing of said indicia are stored in said printer memory.

* * * * *